United States Patent
Schwartz (10) Patent No.: US 7,273,288 B1
(45) Date of Patent: Sep. 25, 2007

(54) RIBBED TELESCOPE MIRRORS WITH THERMAL GRADIENT CONTROL

(76) Inventor: Richard A. Schwartz, 14358 S. Yukon Ave., Hawthorne, CA (US) 90250

( * ) Notice: Subject to any disclaimer, the term of this patent is extended or adjusted under 35 U.S.C. 154(b) by 446 days.

(21) Appl. No.: 10/461,013

(22) Filed: Jun. 13, 2003

(51) Int. Cl.
G02B 7/182 (2006.01)

(52) U.S. Cl. ............ 359/848; 359/871; 359/900; 156/107

(58) Field of Classification Search ............ 359/846, 359/848, 871, 900; 156/107
See application file for complete search history.

(56) References Cited

U.S. PATENT DOCUMENTS

| | | | | |
|---|---|---|---|---|
| 2,235,681 | A * | 3/1941 | Haven et al. | 428/34 |
| 2,988,959 | A * | 6/1961 | Pelkey et al. | 428/116 |
| 3,507,737 | A * | 4/1970 | Busdiecker et al. | 428/120 |
| 3,537,944 | A * | 11/1970 | Berning et al. | 428/34 |
| 3,651,975 | A * | 3/1972 | Callan | 220/4.29 |
| 3,716,347 | A * | 2/1973 | Bergstrom et al. | 428/550 |
| 3,944,181 | A | 3/1976 | Anthony | |
| 3,977,765 | A * | 8/1976 | Lipkins | 359/529 |
| 4,228,912 | A * | 10/1980 | Harris et al. | 220/4.01 |
| 4,320,164 | A * | 3/1982 | Nicolas et al. | 428/167 |
| 4,332,636 | A * | 6/1982 | McLeod | 156/289 |
| 4,337,997 | A * | 7/1982 | Sadoune et al. | 359/848 |
| 4,386,293 | A * | 5/1983 | Waldron | 313/583 |
| 4,415,234 | A | 11/1983 | Meyers | |
| 4,447,130 | A * | 5/1984 | Christiansen et al. | 359/871 |
| 4,485,961 | A * | 12/1984 | Ekbom et al. | 228/193 |
| 4,488,789 | A * | 12/1984 | Kenney | 359/225 |
| 4,613,203 | A * | 9/1986 | Proetel et al. | 359/199 |
| 5,035,495 | A | 7/1991 | Toyoda et al. | |
| 5,352,731 | A * | 10/1994 | Nakano et al. | 524/786 |
| 5,443,884 | A * | 8/1995 | Lusignea et al. | 428/116 |
| 5,563,743 | A | 10/1996 | Nakamura et al. | |
| 5,877,905 | A | 3/1999 | Schwartz | |
| 6,045,231 | A | 4/2000 | Martineau | |
| 6,176,588 | B1 * | 1/2001 | Davis et al. | 359/848 |

FOREIGN PATENT DOCUMENTS

| | | | |
|---|---|---|---|
| JP | 61-057676 | * | 3/1986 |
| JP | 2000-158177 | * | 6/2000 |

* cited by examiner

*Primary Examiner*—Ricky D. Shafer
(74) *Attorney, Agent, or Firm*—Norton R. Townsley; Belasco Jacobs & Townsley, LLP (57) ABSTRACT

Ribbed mirrors allowing heat to be conducted past the glass during optical polish and application of coatings and methods of fabricating same. The method comprises placing a bridge of thermally conductive material in thermal contact with the mirror plate and the supporting rib at the interior angle. The preferred thermally conductive material is RTV silicone. However, the RTV silicone can be mixed with a powdered heat conductor such as diamond dust, aluminum oxide and silicon carbide. Alternatively, the thermally conductive fillet can be made from a segment of thermally conductive rigid material, such as copper, diamond, beryllium, silver and aluminum having an exterior angle matching the interior angle and a thermally conductive plastic such as RTV silicone or thermally conductive grease, silicone or epoxy applied to surfaces of the exterior angle.

22 Claims, 6 Drawing Sheets

RIBBED TELESCOPE MIRRORS WITH THERMAL GRADIENT CONTROL

BACKGROUND OF THE INVENTION

The present invention relates to the field of telescope mirror fabrication and more particularly to a method for reducing the cracking of ribbed mirrors during thermal processing.

There is a great motivation to use ribbed mirrors in telescopes. Ribbed mirrors are lightweight, less glass is needed and commonly available thin glass can be utilized. Ribbed mirrors are stiffer than thin mirrors, which simplifies the supporting structure and reduces dynamic disturbance and vibration. Ribbed mirrors are cheaper to produce, cheaper to launch into orbit, and can be aimed more quickly with less power. Moreover, astronomical telescopes that operate on earth cannot produce sharp images until the mirror surface cools to nearly the same temperature as the ambient air. Ribbed mirrors cool more rapidly than thick mirrors.

George Ritchey, who fabricated the Mt. Wilson 100, a solid mirror, experimented with ribbed mirrors in France in the late 1920's. The ribs were bonded between flat faceplates with Bakelite, the best adhesive then available.

Possibly the first large ribbed mirror is the Palomar 200. Unlike the Ritchey mirrors, the Palomar ribbed mirror has an open back and is a single casting. Subsequently, many large telescopes have been built with ribbed mirrors. In 1980 the Hubble Space Telescope primary mirror was completed. Like the Ritchey mirrors, it has a square rib pattern. It is made of fused silica front, back, and rib pieces welded at high temperature. In Sky & Telescope Magazine, July 1984 p. 71, Ric Rokosz taught the world how to make ribbed mirror blanks by fusion welding of separate pieces of glass. He used Pyrex low expansion glass and high temperatures. As a result, his mirror structure became very soft and required internal support during the fusing process. It has subsequently been found that satisfactory fusion welding can take place at lower temperatures and that, consequently, internal support is not required if the rib pattern resists relative rotation and translation of the faceplates.

Unfortunately, mirrors are exposed to heat loads during optical polishing and during application of some kinds of coating. If the mirror is not made of an expensive material with low coefficient of expansion, thermal gradients will result in mechanical stress that can crack the glass. Because glass is a poor heat conductor, applied heat loads (especially transient heat loads) lead to large thermal gradients—especially where heat flows around a sharp corner.

Development of a fabrication method which can conduct the heat away from the glass during pitch lapping and application of thermally cured coatings represents a great improvement in the field of ribbed mirror fabrication and satisfies a long felt need of telescope builders.

SUMMARY OF THE INVENTION

The present invention is a method of fabricating ribbed mirrors which allows heat to be conducted past the glass during optical polishing and application of coatings. The present invention permits the use of ordinary, inexpensive plate glass for fabrication of ribbed telescope mirrors. The method is applicable to mirrors which have a mirror plate and a supporting rib, joined together at an interior angle. The method comprises placing a fillet of thermally conductive material in thermal contact with the mirror plate and the supporting rib at the interior angle. Thermal contact means that heat easily flows across the part boundary. It is not necessarily the same as mechanical contact or attachment. The preferred thermally conductive material is RTV (room temperature vulcanizing) silicone such as GE-II, manufactured by GE Silicones of Waterford, N.Y. The RTV silicone can be mixed with a powdered or granular heat conductor such as copper, diamond dust, aluminum oxide and silicon carbide. Alternatively, the thermally conductive material can be made from a segment or bridge of thermally conductive rigid material, such as cooper, diamond, beryllium, silver or aluminum, possibly having an exterior angle, and a thermally conductive plastic such as RTV silicone, thermally conductive grease or thermally conductive epoxy applied to the surfaces of the exterior angle or the angled end of the bridge. Another alternative construction utilizes segments of thermally conductive rod, such as copper, diamond, beryllium, silver or aluminum bent to approximate the interior angle, placed close to the interior angle with a fillet of thermally conductive grease, silicone or epoxy between the rod and the mirror and the rod and the rib. Yet another alternative construction utilizes a thermally conductive rod, such as copper, diamond, beryllium, silver or aluminum, placed close to the interior angle with a fillet of thermally conductive grease, silicone or epoxy between the rod and the mirror and the rod and the rib.

Thus, what results from this method is an improved, ribbed telescope mirror with a fillet or bridge of thermally conductive material in thermal contact with the mirror plate and the supporting rib at the interior angle between the mirror plate and supporting rib. The fillet can be made of all the materials identified above. After subjecting the ribbed telescope mirror to the process that generates thermal gradients, the fillet may be removed.

An appreciation of the other aims and objectives of the present invention and an understanding of it may be achieved by referring to the accompanying drawings and description of a preferred embodiment.

DETAILED DESCRIPTION OF THE PREFERRED EMBODIMENT

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

Although ribbed mirrors can be made by several different methods, the last step before testing is always to polish the finely ground mirror surface. Normally polishing is accomplished with a pitch lap. In this process squares of pitch are mounted on a stiff backing that conforms to the shape of the fine-ground mirror. See Chapter 2 of "Procedures in Experimental Physics" by John Strong, Ph.D., Lindsay Publications, Bradley, Ill., 1986. The polishing tool is warmed, and the mirror is pressed onto the softened pitch until there is contact all over. This warm pressing step can crack a ribbed mirror if extreme care is not taken to keep all glass, pitch and lap foundation at equal temperature during both heating and cooling. One way to do this is to slowly heat and cool the mirror and the polishing tool together in a water bath, a trying, time consuming and costly procedure. Then the mirror is polished by stroking it over the pitch lap with cerium oxide slurry. From time to time, as the pitch slowly flows, the channels between the pitch squares must be re-cut and the polishing tool warm-pressed onto the glass and eventually the glass will become polished.

Figure 1:
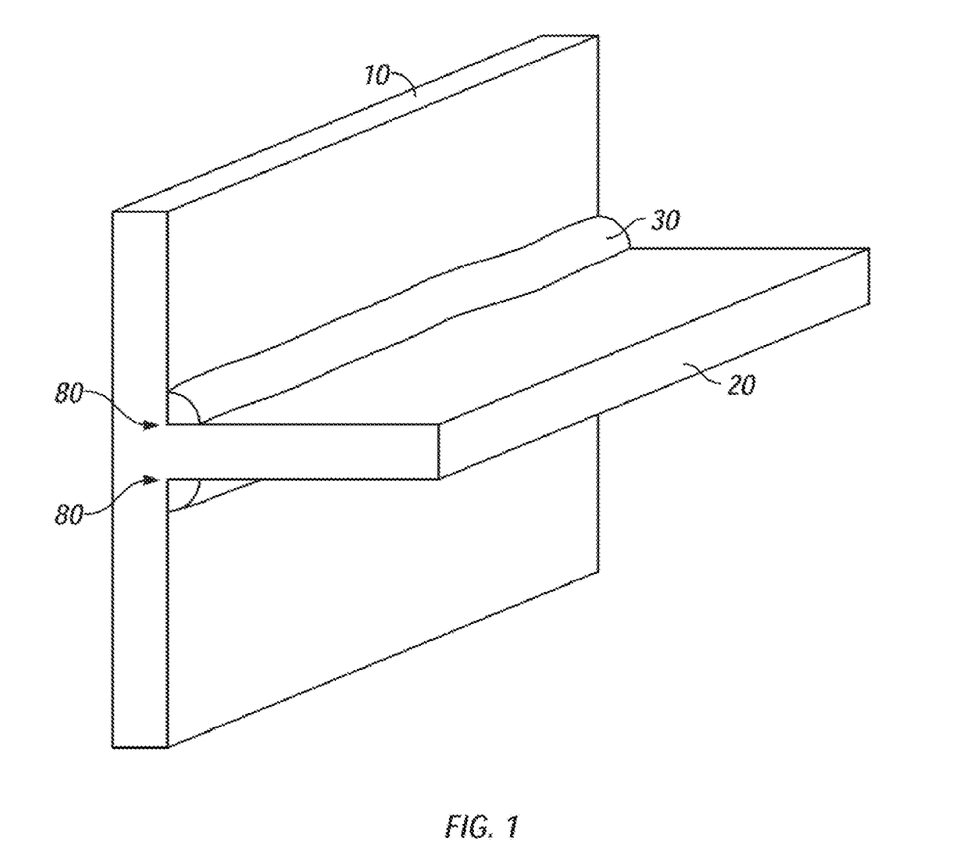
FIG. 1 is a three dimensional sketch showing a mirror plate attached to a rib with a fillet of pliable heat conductor material at the angle between the mirror plate and rib.
Figure 2:
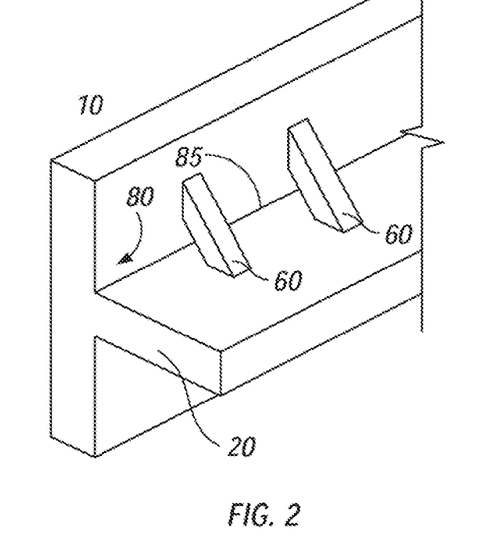
FIG. 2 is a three dimensional sketch showing a mirror plate attached to a rib with a first embodiment segment of pliable heat conductor material bridging the angle between the mirror plate and rib.
Figure 3:
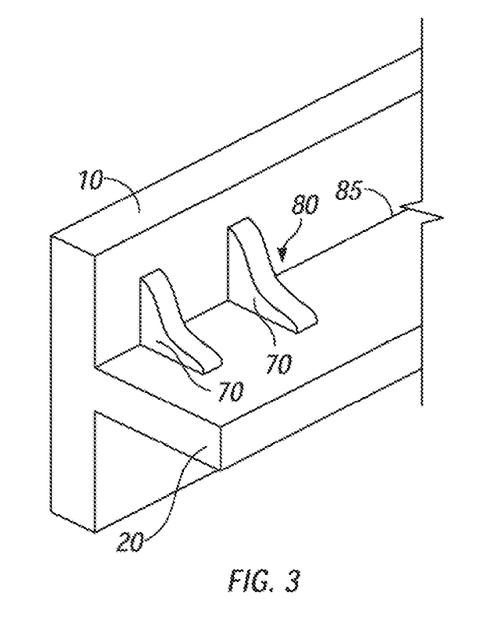
FIG. 3 is a three dimensional sketch showing a mirror plate attached to a rib with a second embodiment segment of pliable heat conductor material at the angle between the mirror plate and rib.

The improved method of this invention comprises placing a fillet of pliable, thermally conductive material in intimate contact with the mirror plate and the supporting rib at the interior angle prior to the pitch lapping (polishing) process. FIG. 1 is a three dimensional sketch showing a mirror plate 10 attached to a rib 20 with a fillet of pliable heat conductor material 30 at the angle 80 between the mirror plate 10 and rib 20. FIG. 2 is a three dimensional sketch showing a mirror plate 10 attached to a rib 20 with a first embodiment segment of pliable heat conductor material 60 at the angle 80 between the mirror plate 10 and rib 20. The first embodiment segment or bridge 60 contacts the plate 10 and rib 20 a short distance from the corner 85. FIG. 3 is a three dimensional sketch showing a mirror plate 10 attached to a rib 20 with a second embodiment segment of pliable heat conductor material 70 at the angle 80 between the mirror plate 10 and rib 20. This embodiment 70 runs all the way into the corner 85.

Figure 4:
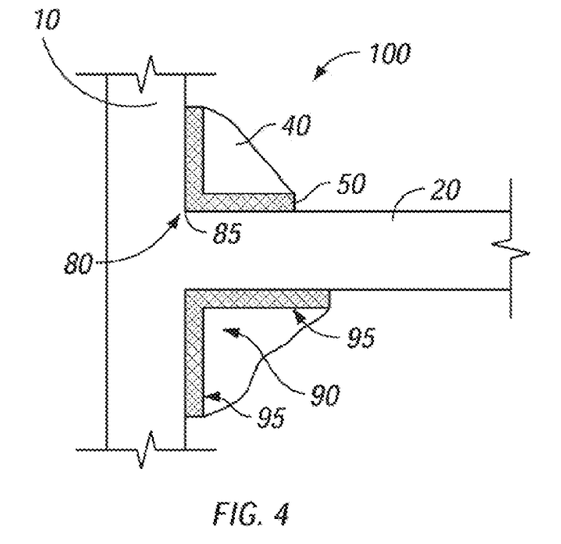
FIG. 4 is a cross section of the joint between a mirror plate and an attached rib with a third embodiment composite fillet of solid and plastic heat conductive material at the angle between the mirror plate and rib.
Figure 5:
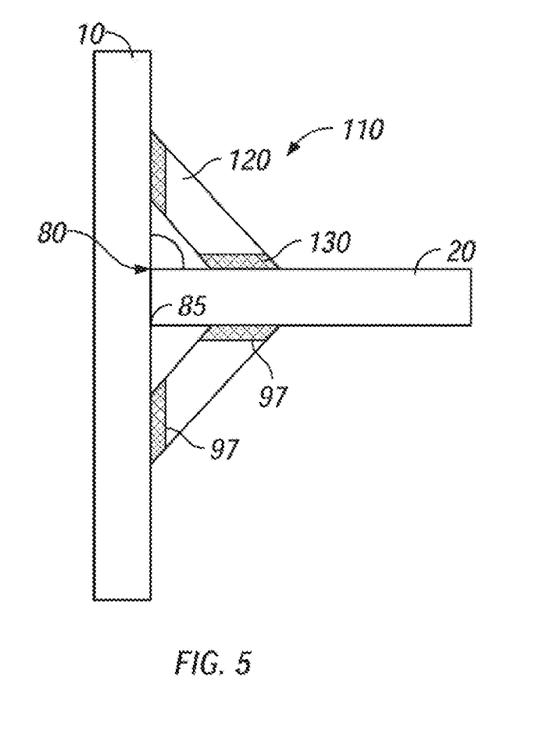
FIG. 5 is a cross section of the joint between a mirror plate and an attached rib with a fourth embodiment composite fillet of solid and plastic heat conductive material bridging the angle between the mirror plate and rib.

The preferred thermally conductive material 30, 60, 70 is RTV silicone such as GE-II, manufactured by of GE Silicones of Waterford, N.Y. The RTV silicone can be mixed with powdered or granular heat conductor such as copper, diamond, aluminum oxide and silicon carbide. Alternatively, as shown in FIGS. 4 and 5, the thermally conductive material can be made from a segment of thermally conductive rigid material 40, 120, such as copper, diamond, beryllium, silver, and aluminum, which may have an exterior angle 90 matching the interior angle 80, and a thermally conductive plastic 50, 130 such as RTV silicone, thermally conductive grease, or thermally conductive epoxy applied to the surfaces 95 of the exterior angle 90 or the ends 97 of the bridge 120. In another alternative, as shown in FIGS. 6 and 7, the conductor 140, 165 may conform poorly to the mating surfaces and rely on the conductive plastic 50, 130 to close any heat flow gaps.

FIG. 4 is a cross section of the joint between a mirror plate 10 and an attached rib 20 with a third embodiment composite fillet 100 of rigid 40 and plastic 50 heat conductive material on the surfaces 95 at the angle 80 between the mirror plate 10 and rib 20. The exterior angle 90 of the rigid heat conductive material 40 matches the interior angle 80 between the plate 10 and rib 20. Consequently, this embodiment 100 runs all the way into the corner 85.

FIG. 5 is a cross section of the joint between a mirror plate 10 and an attached rib 20 with a fourth embodiment composite fillet 110 of rigid 120 and plastic 130 heat conductive material on the angled ends 97 of the bridge 120 close to the angle 80 between the mirror plate 10 and rib 20. This embodiment 110 does not run all the way into the corner 85.

Figure 6:
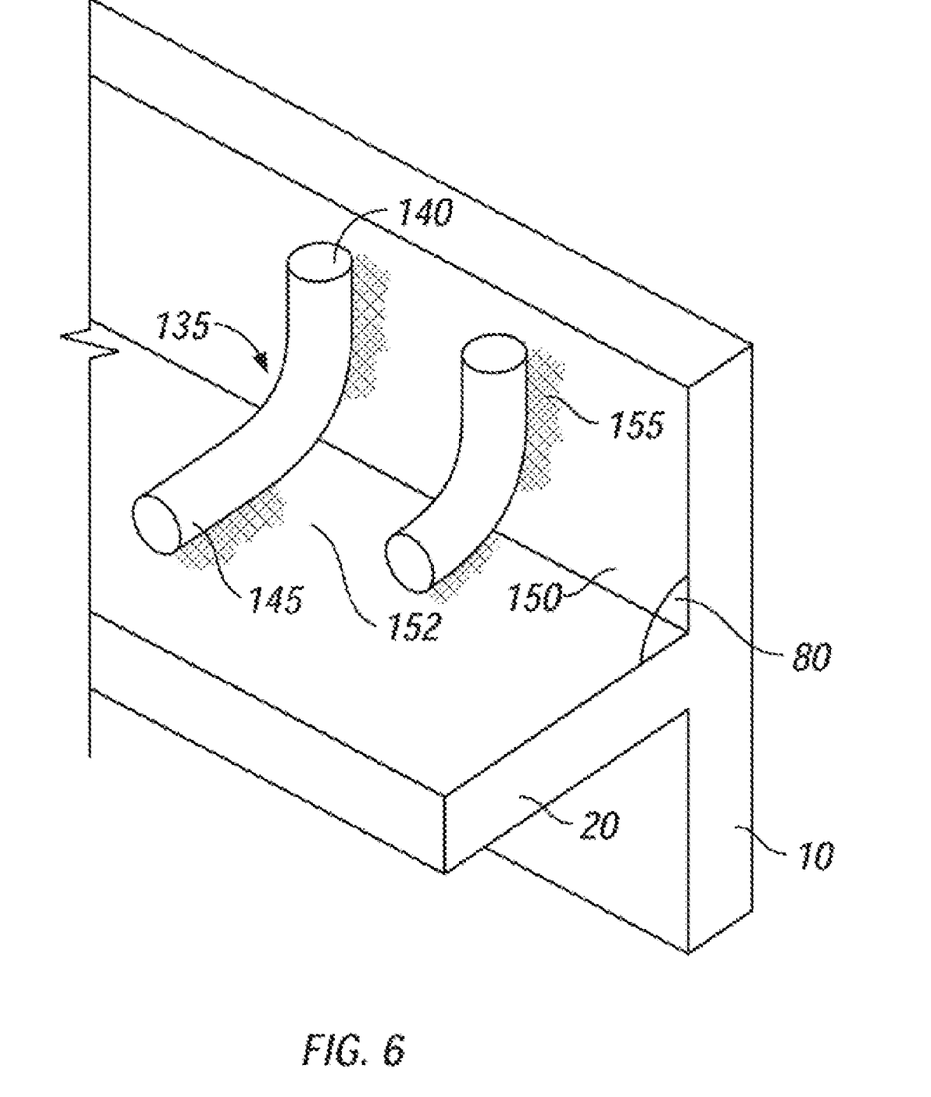
FIG. 6 is a three dimensional sketch showing a mirror plate and rib with fifth embodiment solid and plastic heat conductive material where copper or aluminum wires bridge the angle between the mirror plate and rib. The solid head conductor need not fit the mirror surfaces.
Figure 7:
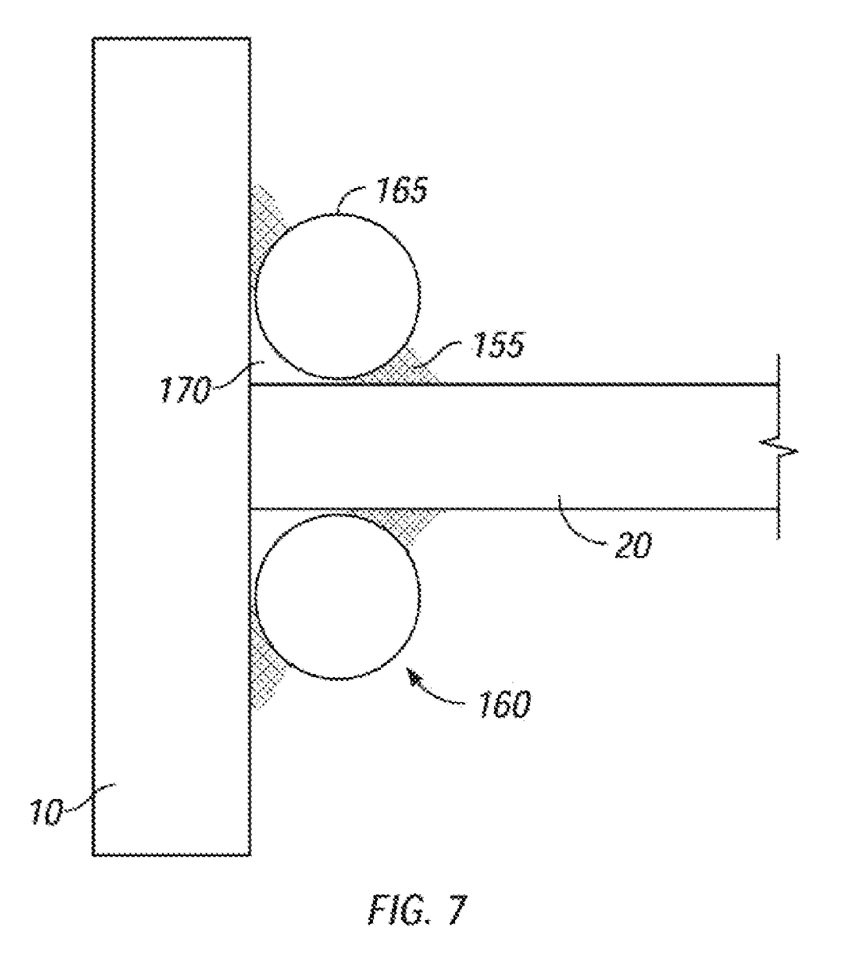
FIG. 7 is a cross section of the joint between a mirror plate and an attached rib with a sixth embodiment composite fillet of solid rod and plastic heat conductive material bridging the angle between the mirror plate and rib. The solid heat conductor surface does not need to fit the mirror surface.

FIG. 6 is a three dimensional sketch showing a mirror plate 10 attached to a rib 20 with a fifth embodiment composite, segmented fillet 135 between the poorly mated surface 145 of the heat bridge 140 and the surfaces of the mirror 150 and rib 152. The heat conducting bridge 140 is made from heavy copper, silver or aluminum wire bent at an angle to approximate the interior angle 80. As shown on the Figure, not all the bridges 140 are necessarily the same length. The bridges 140 are thermally connected to the surfaces 150 with fillets of thermally conductive grease, silicone or epoxy 155.

Figure 8:
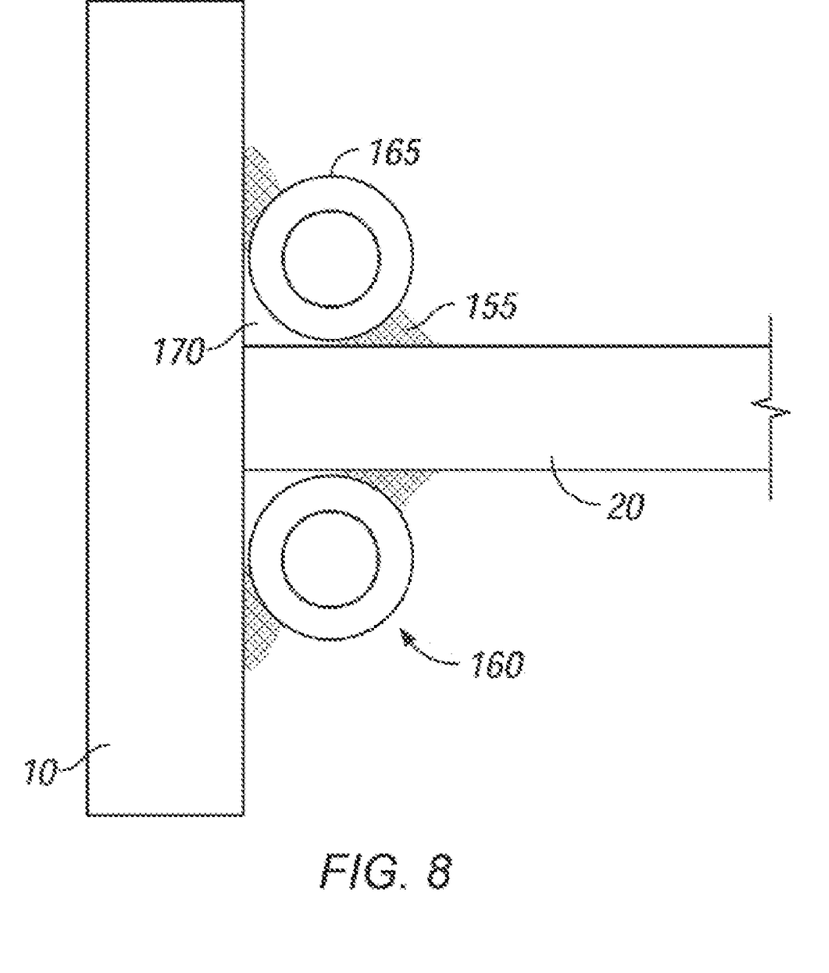
FIG. 8 is a cross section of the joint between a mirror plate and an attached rib with a sixth embodiment composite fillet of tube and plastic heat conductive material bridging the angle between the mirror plate and rib. The tubular heat conductor surface does not need to fit the mirror surface.

FIGS. 7 and 8 show cross sections of joints between a mirror plate 10 and a rib 20 with a sixth embodiment continuous, composite fillet 160 of rigid tube or rod 165 and plastic heat conductor of thermally conductive grease, silicone or epoxy 155. The tube or rod 165 is preferably made from copper, silver or aluminum. Note that there will probably be a void 170 in the corner 85.

Thus, what results from this method is an improved, ribbed telescope mirror with a fillet of thermally conductive material 30, 60, 70, 100, 110, 145, 170 in thermal contact with the mirror plate 10 and the supporting rib 20 at the interior angle 80 between the mirror plate 10 and supporting rib 20. The fillet 30, 60, 70, 100, 110, 145, 170 can be made of all the materials identified above.

Those most familiar with the art to which this invention pertains will readily appreciate that grease can readily be removed from any surface with rags and solvent. Also, RTV is easy to remove from surfaces with a blade or scraper. Consequently, if desired, the fillet 30, 60, 70, 100, 110, 145, 170 can be removed after the pitch lapping step. In addition, it will readily be appreciated that, while this invention has been described primarily in relation to pitch lapping of telescope mirrors, it is also applicable to other processes that produce thermal gradients in glass, such as application of heat cured coatings.

There are two situations that need to be addressed: steady state heat flow, and transient thermal shock. Besides the dimensions of the heat conducting element, the important variables are the thermal conductivity and (for transient heat loads) the specific heat. One dimension and material may not fit all situations: finite element modeling may be required to find an acceptable combination of material and fillet dimensions.

The following reference numerals are used on FIGS. 1 through 7:
- 10 Mirror plate
- 20 Supporting rib
- 30 Fillet
- 40 Thermally conductive solid
- 50 Thermally conductive plastic
- 60 First embodiment—bridge segment
- 70 Second embodiment—segment
- 80 Angle between mirror plate and rib—interior angle
- 85 Corner
- 90 Exterior angle of thermally conductive solid
- 95 Surface adjacent the exterior angle
- 100 Third embodiment composite fillet
- 110 Fourth embodiment composite fillet
- 120 Thermally conductive solid bridge
- 130 Thermally conductive plastic
- 135 Fifth embodiment composite fillet
- 140 Heat conductive wire
- 145 Surface of wire
- 150 Back surface of mirror plate
- 152 Surface of rib
- 155 Thermally conductive plastic
- 160 Sixth embodiment composite fillet
- 165 Heat conducting tube or rod
- 170 Void Thus, the present invention has been described herein with reference to particular embodiments for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A method of reducing thermal gradients during fabrication of a ribbed telescope mirror, said ribbed telescope mirror having a mirror plate and a supporting rib, said mirror plate and supporting rib having been joined together at an interior angle during a previous fabrication step, comprising the step of placing a separate, removable fillet of thermally conductive material in thermal contact with said mirror plate and said supporting rib at said interior angle prior to a step of subjecting said ribbed telescope mirror to a subsequent fabrication step that generates thermal gradients.

2. A method as claimed in claim 1 in which said thermally conductive material is room temperature vulcanizing silicone.

3. A method as claimed in claim 1 in which said thermally conductive material is room temperature vulcanizing silicone mixed with a powdered heat conductor.

4. A method as claimed in claim 3 in which said powdered heat conductor is a material selected from the group consisting of copper, diamond, aluminum oxide and silicon carbide.

5. A method as claimed in claim 1 in which said thermally conductive material is room temperature vulcanizing silicone mixed with a granular heat conductor.

6. A method as claimed in claim 5 in which said granular heat conductor is a material selected from the group consisting of copper, diamond, aluminum oxide and silicon carbide.

7. A method as claimed in claim 1 in which said thermally conductive material comprises:
   a) a segment of thermally conductive rigid material having an exterior angle approximately equal to said interior angle; and
   b) a thermally conductive plastic applied to the exterior surface of said exterior angle.

8. A method as claimed in claim 7 in which said thermally conductive rigid material is selected from the group consisting of copper, diamond, beryllium, silver and aluminum.

9. A method as claimed in claim 7 in which said thermally conductive plastic is selected from the group consisting of room temperature vulcanizing silicone, thermally conductive epoxy and thermally conducive grease.

10. A method as claimed in claim 1 in which said thermally conductive material comprises:
    a) a segment of thermally conductive rigid material having angled ends, placed to form a bridge close to said interior angle; and
    b) a thermally conductive plastic applied to said ends.

11. A method as claimed in claim 10 in which said thermally conductive rigid material is selected from the group consisting of copper, diamond, beryllium, silver and aluminum.

12. A method as claimed in claim 10 in which said thermally conductive plastic is selected from the group consisting of room temperature vulcanizing silicone, thermally conductive epoxy and thermally conductive grease.

13. A method as claimed in claim 1 in which said thermally conductive material comprises:
    a) a segment of thermally conductive wire, bent to approximate said interior angle and placed as close as possible to said interior angle; and
    b) a thermally conductive plastic between the exterior surface of said wire and said mirror plate and between the exterior surface of said wire and said supporting rib.

14. A method as claimed in claim 13 in which said thermally conductive wire is selected from the group consisting of copper, silver and aluminum.

15. A method as claimed in claim 13 in which said thermally conductive plastic is selected from the group consisting of room temperature vulcanizing silicone, thermally conductive epoxy and thermally conductive grease.

16. A method as claimed in claim 1 in which said thermally conductive material comprises:
    a) a thermally conductive rod placed in said interior angle; and
    b) a thermally conductive plastic between the exterior surface of said rod and said mirror plate and between the exterior surface of said rod and said supporting rib.

17. A method as claimed in claim 16 in which said thermally conductive rod is selected from the group consisting of copper, silver and aluminum.

18. A method as claimed in claim 16 in which said thermally conductive plastic is selected from the group consisting of room temperature vulcanizing silicone, thermally conductive epoxy and thermally conductive grease.

19. A method as claimed in claim 1 in which said thermally conductive material comprises:
    a) a thermally conductive tube placed in said mirror angle; and
    b) a thermally conductive plastic between the exterior surface of said tube and said mirror plate and between the exterior surface of said tube and said supporting rib.

20. A method as claimed in claim 19 in which said thermally conductive tube is selected from the group consisting of copper, silver and aluminum.

21. A method as claimed in claim 19 in which said thermally conductive plastic is selected from the group consisting of room temperature vulcanizing silicone, thermally conductive epoxy and thermally conductive grease.

22. A method as claimed in claim 1, 2, 3, 4, 5, 6, 7, 8, 9, 10, 11, 12, 13 14, 15, 16, 17, 18, 19, 20, or 21 further comprising the step of removing said thermally conductive material after the step of subjecting said ribbed telescope mirror to a subsequent fabrication step that generates thermal gradients.

* * * * *